UNITED STATES PATENT OFFICE.

GUSTAV A. LIEBIG, OF BALTIMORE, MARYLAND, ASSIGNOR OF ONE-HALF TO JOHN F. GIBBONS, OF SAME PLACE.

TREATING PHOSPHATES FOR FERTILIZERS.

SPECIFICATION forming part of Letters Patent No. 241,868, dated May 24, 1881.

Application filed January 8, 1881. (Specimens.)

*To all whom it may concern:*

Be it known that I, GUSTAV A. LIEBIG, a resident of Baltimore, Maryland, have invented a new and Improved Method of Treating Fertilizing Phosphates; and I hereby declare the following to be a full, clear, and exact description thereof, which will enable others skilled in the art to fully understand and make use of the same.

My object is to produce from the ordinary crude phosphates or phosphorites an available phosphoric acid for plant-food and fertilizing purposes, which when placed upon the land will be absorbed by the root of the plant and become available as an excellent fertilizer.

It is well known that heretofore it has been thought necessary to a good fertilizing phosphate that its phosphoric acid should be soluble, or partially soluble, in water, and to this end the crude phosphates or phosphorites are treated with sulphuric acid to decompose the insoluble bone phosphate of lime contained in the crude material into a soluble biphosphate of lime. In some cases such phosphorites which are composed of phosphate of iron or alumina have been treated by heating them with soda or potash and their combinations, in connection with carbonaceous matter, thereby producing a phosphate of soda or potash which contains soluble phosphoric acid. In either case the object sought was the production of a soluble phosphoric acid. The first-named method is the one generally in use, and involves a large outlay and expenditure of money in the construction of the necessary acid-chambers, and its product is objected to by some farmers, who believe that the introduction of so much sulphuric acid into the soil annually is productive of no good to the land. The other method is too expensive for general use.

In the course of a long experience and numerous experiments upon various soils and crops, I have discovered that crude phosphates or phosphorites, when simply treated as hereinafter described, though insoluble in water, possess a large quantity of phosphoric acid, which is just as available when placed upon the land, and quite as readily absorbed by the plant, as those which are treated by the methods described, while I am enabled to dispense with the use of sulphuric acid and soda or potash in any form.

My mode of treatment is as follows: I take the crude phosphates or phosphorites, mix with them common coal, charcoal, or other carbon, and subject them to great heat, which results in a mass containing a large percentage of phosphoric acid, which, though insoluble in water, is readily available for fertilizing purposes, and is absorbed equally as well by the plant as those phosphorites which, by former methods, were rendered soluble in water. This mass is usually pulverized before being placed upon the land. The exact proportion of coal or carbon used with the phosphate or phosphorite I am unable to state. It would depend somewhat upon the character of the phosphate or phosphorite. I have found, however, for general use, about two parts of the phosphate or phosphorite to one part of coal will give excellent results.

Having thus described my invention, what I claim, and desire to secure by Letters Patent, is—

1. The above-described method of treating phosphates or phosphorites, by mixing them with carbon and subjecting them to heat, for fertilizing purposes.

2. The product obtained by the above-described treatment of phosphates—viz., a calcined mineral phosphate for plant-food and fertilizing purposes, substantially as described.

GUSTAV A. LIEBIG.

Witnesses:
BENJN. PRICE,
F. ALEX. SETH.